US007697509B2

(12) United States Patent
Freitag et al.

(10) Patent No.: US 7,697,509 B2
(45) Date of Patent: Apr. 13, 2010

(54) DYNAMIC E911 UPDATING IN A VOIP TELEPHONY SYSTEM

(75) Inventors: Gregory A. Freitag, Batavia, IL (US); Mohamad M. Mehio, Naperville, IL (US); Gerald W. Pfleging, Batavia, IL (US); George P. Wilkin, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1343 days.

(21) Appl. No.: 11/144,445

(22) Filed: Jun. 3, 2005

(65) Prior Publication Data

US 2006/0274725 A1 Dec. 7, 2006

(51) Int. Cl.
*H04L 12/66* (2006.01)
*H04M 11/04* (2006.01)
(52) U.S. Cl. .................. 370/352; 455/404.1; 455/404.2
(58) Field of Classification Search .................. 379/37, 379/40, 45, 49, 389; 340/539.18; 719/213, 719/219, 220; 370/352; 455/404.1, 404.2
See application file for complete search history.

(56) References Cited

U.S. PATENT DOCUMENTS 7,042,985 B1 * 5/2006 Wright ........................ 379/45

2003/0154276 A1 * 8/2003 Caveney ....................... 709/223

OTHER PUBLICATIONS

Blommers, John, OpenView Network Node Manger, 2001, Printice Hall, pp. 48, 53, 64-69.*

* cited by examiner

*Primary Examiner*—Rasha S Al Aubaidi
(74) *Attorney, Agent, or Firm*—Carmen Patti Law Group, LLC

(57) ABSTRACT

A method in one example comprises the steps of establishing a location database for a first network that associates Internet Protocol address information for VOIP telephony devices with physical locations for the VOIP telephony devices; upon detecting registration of a VOIP telephony device through a network port of the first network, determining physical location of the VOIP telephony device by identifying physical location of the network port through which the VOIP telephony device is connected, and updating the location database; and, upon detecting IP telephony activity originating from a remote VOIP telephony device connected to the first network through a VPN gateway, determining physical location of the remote VOIP telephony device connected through the VPN gateway by identifying physical locations of network resources of a second network to which the remote VOIP telephony device is connected, and updating the location database; such that updated location information is provided to a 911 server in the event that an emergency call is originated by any VOIP telephony device or remote VOIP telephony device.

22 Claims, 3 Drawing Sheets

DYNAMIC E911 UPDATING IN A VOIP TELEPHONY SYSTEM

BACKGROUND

This application is directed generally to communication systems and in particular to telecommunication networks that support Voice over Internet Protocol (VoIP) operation, and is more particularly directed toward providing accurate location information in conjunction with emergency calls placed through 911.

One of the larger obstacles in implementing VOIP/IP telephony solutions is the need for up-to-date E911 information in the case of an emergency. Most systems commercially available now require that configuration changes be made in back-end databases manually, or through some user submission, each time the phone is moved, or that information be maintained in the phone itself that must be configured if the phone is moved, or service will not be provided for a 911 call if placed within the system.

For most users of desk-based sets (in an enterprise environment or at home), this is not a major problem, as once the set is installed it does not usually move. However, this limits one of the major benefits of moving to this type of phone service: the ability to move the phone with you as you move throughout a campus, neighborhood, or other diverse locations.

SUMMARY

The invention in one implementation encompasses a method. The method comprises the steps of establishing a location database for a first network that associates Internet Protocol address information for VOIP telephony devices with physical locations for the VOIP telephony devices; upon detecting registration of a VOIP telephony device through a network port of the first network, determining physical location of the VOIP telephony device by identifying physical location of the network port through which the VOIP telephony device is connected, and updating the location database; and, upon detecting IP telephony activity originating from a remote VOIP telephony device connected to the first network through a VPN gateway, determining physical location of the remote VOIP telephony device connected through the VPN gateway by identifying physical locations of network resources of a second network to which the remote VOIP telephony device is connected, and updating the location database; such that updated location information is provided to a 911 server in the event that an emergency call is originated by any VOIP telephony device or remote VOIP telephony device.

Another implementation of the invention encompasses a system. The system comprises means for establishing a location database for a first network that associates Internet Protocol address information for VOIP telephony devices with physical locations for the VOIP telephony devices; means for detecting registration of a VOIP telephony device through a network port of the first network; means for determining physical location of the VOIP telephony device by identifying physical location of the network port through which the VOIP telephony device is connected, and updating the location database; and means for detecting IP telephony activity originating from a remote VOIP telephony device connected to the first network through a VPN gateway, determining physical location of the remote VOIP telephony device connected through the VPN gateway by identifying physical locations of network resources of a second network to which the remote VOIP telephony device is connected, and updating the location database; such that updated location information is provided to a 911 server in the event that an emergency call is originated by any VOIP telephony device or remote VOIP telephony device.

DESCRIPTION OF THE DRAWINGS

Features of exemplary implementations of the invention will become apparent from the description, the claims, and the accompanying drawings in which:

DETAILED DESCRIPTION

The present invention allows for a method of dynamic update of personal location data to back-end systems that need to feed outgoing 911 calls in a VOIP Telephony System. The invention allows users of VOIP phones to be able to move freely with their telephony devices and have correct data still populated in the systems that feed 911 when a call is placed. This solution does not, at this time, cover the use of fully mobile user devices, but can encompass this type of user with the addition of wireless location technologies.

In constructing and maintaining a database of location information, one may gather information about network topology, collect location information for network components from network administrators, assimilate information on end users and their associated information (line numbers, room location, DNS and DHCP information from servers), operate on the data to map the end point connections to physical space, create a list of unknown locations for further data collection, perform analysis on the unknowns to place them in probable locations and query the end user with a Voice Response script to verify the location guesses, and target any unknowns for human intervention.

The above would use known information about the network ports of the VOIP system, as well as other network data stored in the support servers. Current and evolving advanced networking systems contain much of the information necessary to pinpoint the location of devices attached to them. These settings are typically provisioned at the time the network elements are installed and are updated when managed ports on the units are brought into service. This information can be retrieved through automated means by using SNMP (Simple Network Management Protocol).

A second included method would take the above-described database and perform regular audits to validate the data. If a worker moves their phone to a new location, the system will note the address or path change and mark the phone as "moved." This change can be queried by the voice response system in real time for the new location information. Alternatively, the system can verify the location based on information available from the network connection used, end point information, network path, and similar data. Further improvements in the system can allow for multiple locations to be learned and remembered by the database.

This would allow for the 911 database to accept dynamic data changes. This method relies on the correct configuration of the location information in the network elements. This would also allow for the use of Centrex and other VOIP systems more easily on laptops with soft phones and from virtual locations. The information that is retrieved from this process will be fed to the back-end systems providing routing of 911 calls, and the information that is necessary for the 911 systems to find a user when a call is made.

Figure 1:
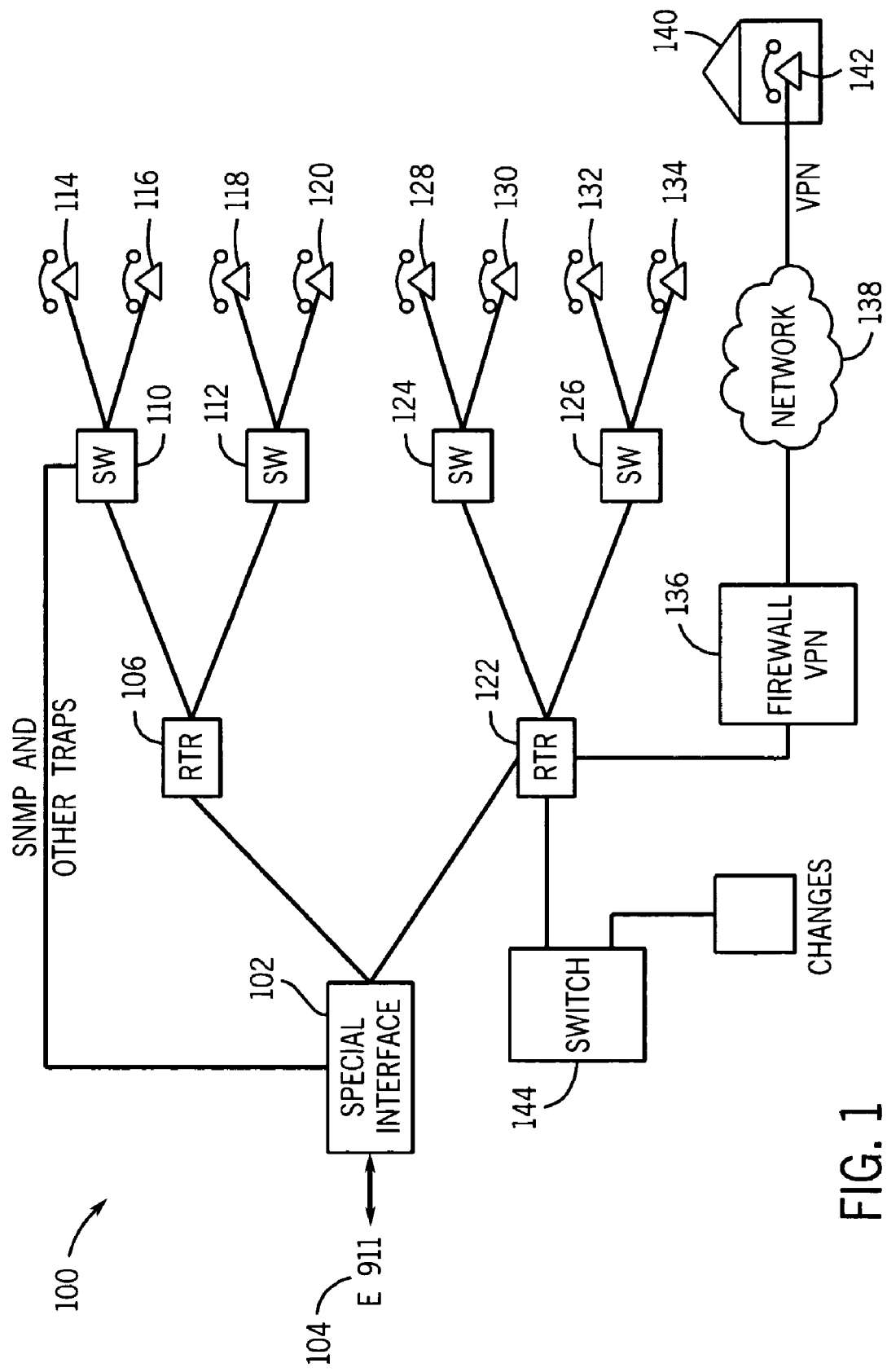
FIG. 1 is a representation of a portion of a typical broadband network that supports VoIP services.

FIG. 1 illustrates a communications network, generally depicted by the numeral 100. The network 100 includes routers 106, 122 that are in turn coupled to switches 110, 112, 124, and 126 to provide connection to VoIP devices 114, 116, 118, 120, 128, 130, 132, and 134. Typically, the hardware ports on the switches 110, 112, 124, and 126, to which the VoIp devices are coupled, are in known locations, such as in offices, laboratories, etc. Additional VoIP devices, such as device 142, located in the home 140 of a user, are accessible over a virtual private network (VPN) through a firewall and VPN gateway 136. In general, VPN access is provided in a known manner, such as through a second network 138, which may be the Internet. A special interface 102 is maintained to the E911 system 104 to communicate location information for the VoIP devices on the network.

If GPS information is one of the items available in the retrieved information, messages with the GPS location can attempt to find a matching area that has been mapped to the back-end systems. If there is a match, the back-end systems will be updated with information to show where the phone currently is in the enterprise or home/apartment complex. If the phone is in a location that is not recognized by the system, a message will be relayed to the user that their 911 information could not be updated for the location they are currently in. They would then have the option to have the system connect them to an operator to get their information updated, or they could use a speech to text system to have the system update itself. If they are using a soft phone or a device with a keyboard, they can be prompted to manually add the data (this would be useful when accessing the system from a remote location where connection information cannot be gathered, such as Starbucks or the airport). This option would allow the user to also specify a radius if they would like to account for the possibility that they are in an open location or house, etc., that would have one 911 instance.

In the event that a user called 911 from a connected phone, the normal wireline 911 message would be sent to the switch 144 when calling 911. The system could also execute a set of calls to inform internal personnel (for a corporate implementation), or a list of friends/family members (for a home user), that there is an emergency, and have them bridged into the conversation as full or listen-only participants. The calls could be packet-based calls to paging services, security systems, mapping systems, or e-mail converters instead of, or in addition to, telephone calls.

Figure 2:
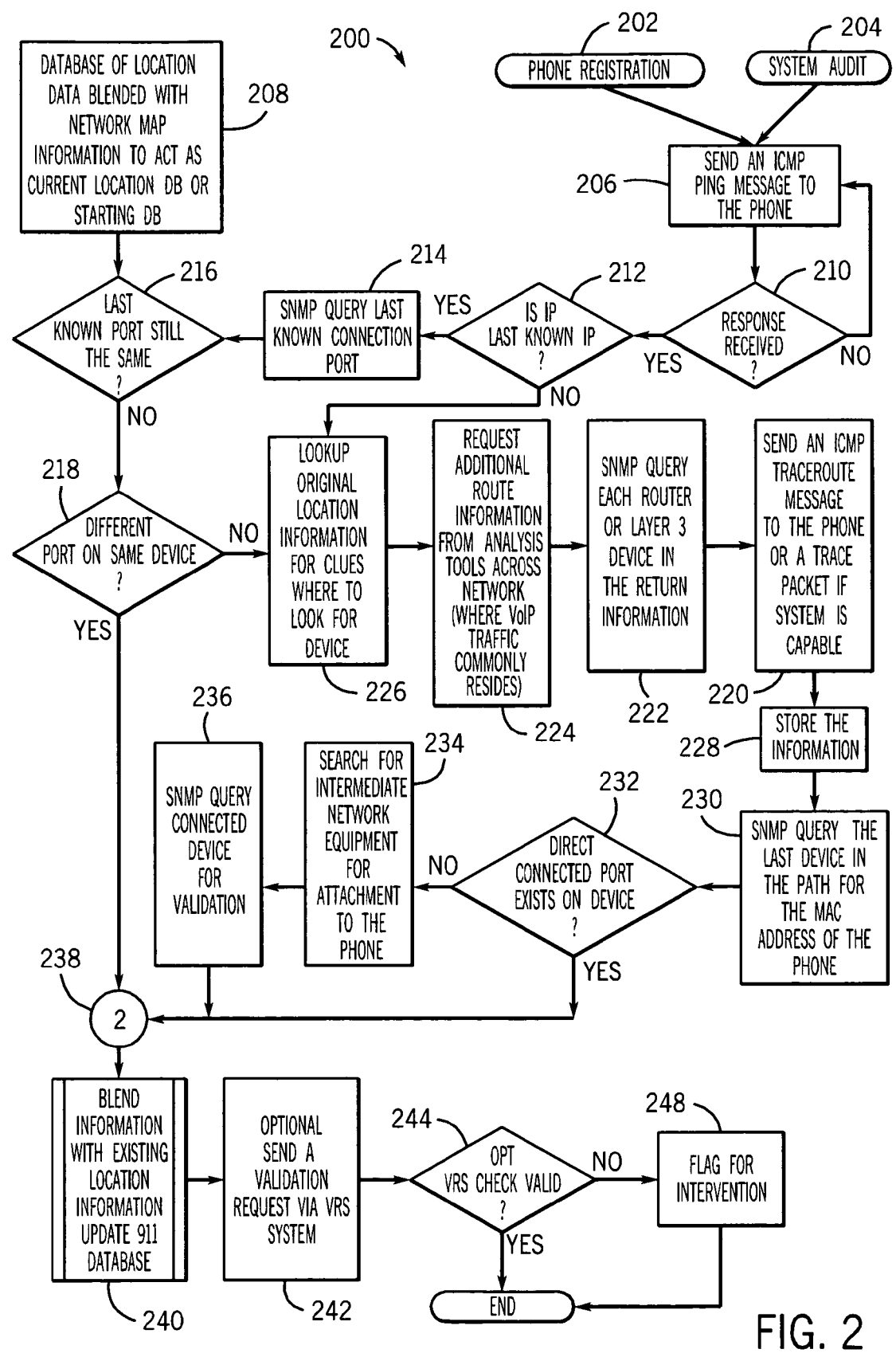
FIG. 2 is a flow chart of a process for maintaining updated location information.

The process 200 depicted in FIG. 2 can begin either as a result of phone registration 202, or via a periodic system audit 204. As noted previously, a database of location data blended with network map information 208 is constructed to act as the current location database or initial database.

First of all, an ICMP ping message 206 is transmitted to the phone. It is well known to those skilled in the art that ICMP is the Internet Control Message Protocol. ICMP allows for the generation of various error messages, test packets, and informational messages. If a response is received 210, the IP address of the phone is compared to the last known IP address 212. If the addresses are the same, a SNMP query 214 is sent to the last known connection port. The SNMP, or Simple Network Management Protocol, is used to manage nodes on an IP network, and can be utilized to manage and monitor other computers, routers, switches, etc.

If no response is received to the ping message, the message is repeated, and it there is still no response, an error message is generated that requires human intervention to ascertain the phone location. If the last known port is still the same 216, no further location updates are required. If the ports are not the same, the system determines whether the phone is now connected to a different port on the same device 218. If so, database information is then updated using a process to be described subsequently. The newly acquired information is blended with existing information 240, and the 911 database is updated. A voice response system VRS may be tasked to send a validation request 242, and, if the optional VRS check is valid 244, the update process is completed. If the VRS check indicates a discrepancy, then an error message is generated 248 and human intervention is initiated.

In the event that the IP address of the phone is not the same as the last known IP address, or it is determined that the phone is not connected to a different port on the same device to which the phone was last connected, then an algorithm 226 is initiated in which the original location information is checked for clues indicated where to look for the device. Additional route information is requested 224 from analysis tools across the network, where VoIP traffic normally resides, and an SNMP query is sent 222 to each router or layer 3 device in the return information. An ICMP traceroute message 220 is then sent to the phone. In the alternative, a trace packet may be transmitted if the system has that capability.

The information from the traceroute message or trace packet is then stored 228. An SNMP query 230 is sent to the last device in the path for the MAC address of the phone. If a directly connected port does not exist on the device 232, a search 234 is initiated for intermediate network equipment for attachment to the phone, and an SNMP query 236 is sent to the connected device for validation. The database information is then updated using a process 238 described below. If a directly connected port does exist on the device 232, database information is simply updated 238.

Figure 3:
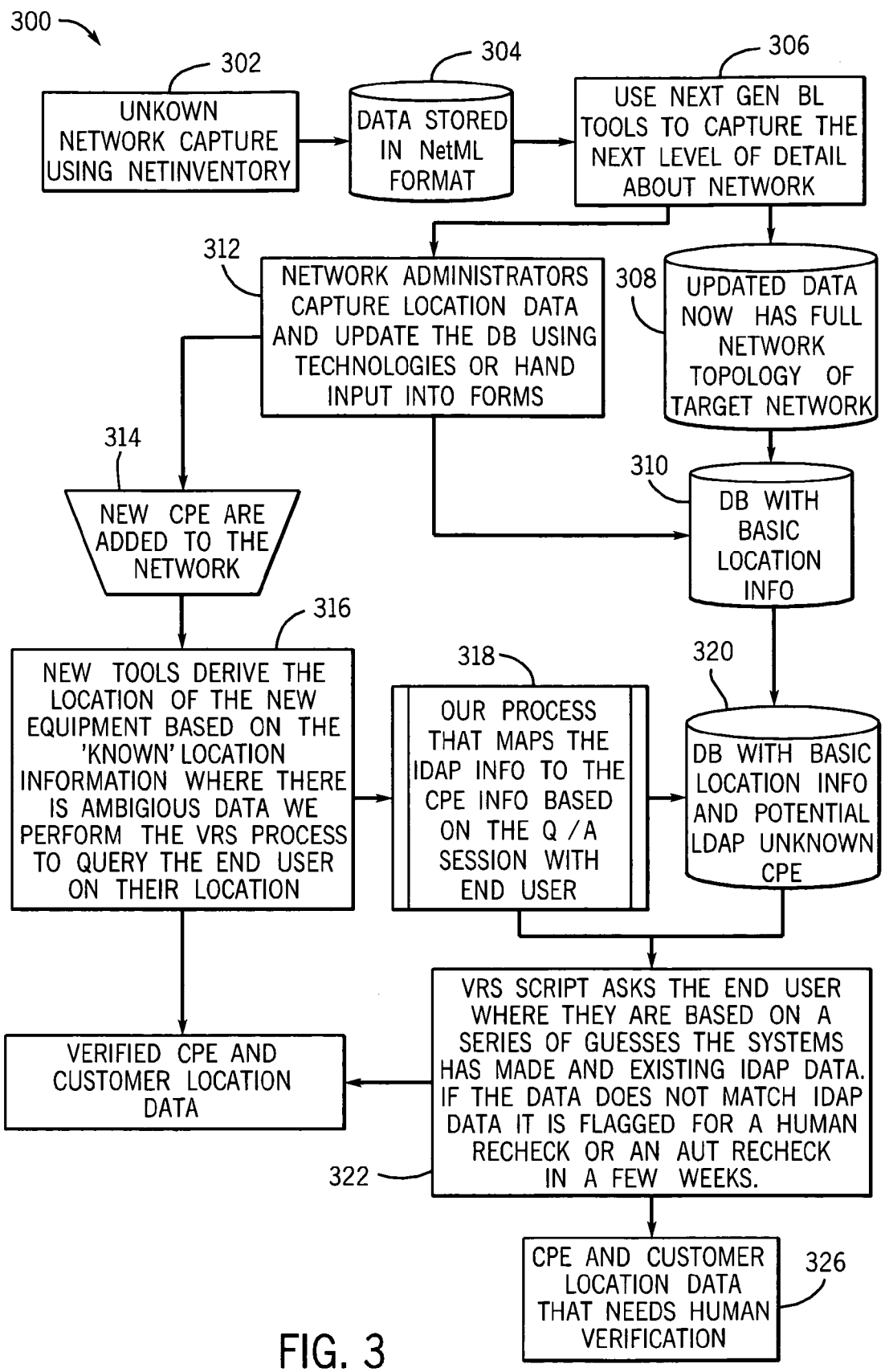
FIG. 3 is a flow chart illustrating initial formation and maintenance of a database.

The flow chart 300 of FIG. 3 indicates that, as a general principle, significant detail regarding an unknown network can be captured using Netinventory 302, and the resulting data may be stored in NetML format 304, or other suitable format. Network tools 306 are then used to capture the next level of detail about the network, and the updated data 308 will now have the full network topology of the captured network.

Network administrators are tasked 312 to capture location data and update the database either through specialized application programs or by manually inputting the data into forms. The database is then updated 310 with known location information. Whenever new CPE (Customer Premises Equipment) is added 314 to the network, new tools derive the location of the new equipment based upon the known location information 316. Where ambiguities arise, a VRS process is employed to query the end user concerning location information.

LDAP information (information collected using the Lightweight Directory Access Protocol, that includes such attributes as name and device type) is mapped 318 to the CPE information based upon a question and answer session with the end user. The database is then updated 320 to include basic location information and potential LDAP entries for unknown CPE.

To resolve ambiguities and complete the database update, a VRS script 322 asks the user where he or she is, based upon both a series of guesses the system has made and existing LDAP data. If the data recovered by the VRS application does not match the LDAP data, an error message is generated and human intervention is required. The CPE and customer location data are then checked and updated by a human operator 326.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method comprising the steps of:
    (a) establishing a location database for a first network that associates Internet Protocol address information for Voice over Internet Protocol (VOIP) telephony devices with physical locations for the VOIP telephony devices;
    (b) upon detecting registration of a VOIP telephony device through a network port of the first network, determining physical location of the VOIP telephony device by identifying physical location of the network port through which the VOIP telephony device is connected, and updating the location database, wherein determining the physical location of the network port through which the VOIP telephony device is connected comprises i) sending an Internet Control Message (ICMP) Protocol Ping message to the VOIP telephony device, ii) comparing a present Internet Protocol (IP) address to a last known IP address, and iii) upon determining that the present IP address is the same as the last known IP address, sending a Simple Network Management Protocol (SNMP) query to the last known connection port to determine if the VOIP telephony device is located on a different port of a same device; and
    (c) upon detecting IP telephony activity originating from a remote VOIP telephony device connected to the first network through a virtual private network (VPN) gateway, determining physical location of the remote VOIP telephony device connected through the VPN gateway by identifying physical locations of network resources of a second network to which the remote VOIP telephony device is connected, and updating the location database;
    such that updated location information is provided to a 911 server in the event that an emergency call is originated by any one of a VOIP telephony device and remote VOIP telephony device.

2. The method in accordance with claim 1, wherein the step (a) of establishing a location database for a first network further comprises the steps of:
    (a1) capturing information regarding network elements using Netinventory and storing the captured information in a database using NetML format;
    (a2) capturing the subsequent level of network detail using network tools and updating the database to include substantially complete network topology; and
    (a3) capturing location data regarding the network elements and updating the database to include basic location information.

3. The method in accordance with claim 1, further comprising the steps of:
    (b3) upon determining one of i) that the present IP address is not the same as the last known IP address and ii) that the VOIP telephony device is located on the different port of the same device, accessing and analyzing original location information;
    (b4) requesting additional route information based upon application of analysis tools across the network;
    (b5a) sending an SNMP query to each router or layer 3 device in the return information; and
    (b5) sending an ICMP traceroute message to the VOIP telephony device.

4. The method in accordance with claim 3, wherein the step (b5a) of sending an ICMP traceroute message further includes the step of sending a trace packet.

5. The method in accordance with claim 3, further comprising the steps of:
    (b6) storing information returned from the ICMP traceroute message;
    (b7) sending an SNMP query to the last device in the path for the MAC address of the VOIP telephony device;
    (b8) determining whether a direct connected port exists on the device; and
    (b9) if so, updating the location database.

6. The method in accordance with claim 5, further comprising the steps of:
    (b10) upon determining that there is no direct connected port on the device, searching for intermediate network equipment for attachment to the VOIP telephony device;
    (b11) transmitting an SNMP query to the connected device for validation; and
    (b12) updating the location database.

7. The method in accordance with claim 1, further comprising the steps of:
    (d) upon determining that a location ambiguity exists, transmitting a location validation request to the VOIP telephony device via a Voice Response System (VRS); and
    (e) evaluating VRS data to determine whether ambiguity has been substantially eliminated.

8. The method in accordance with claim 7, further comprising the steps of:
    (f) upon determining that ambiguity still exists after evaluating VRS data, generating an error message; and
    (g) soliciting human intervention to determine location information for the VOIP telephony device.

9. The method in accordance with claim 1, wherein the step (c) of determining physical location of the remote VOIP telephony device connected through the VPN gateway further comprises the step of transmitting an SNMP query through the VPN gateway to identify network elements of the second network to which the VOIP telephony device is connected.

10. The method in accordance with claim 9, wherein results of the SNMP query are evaluated and compared to prior connection data for the VOIP telephony device connected through the VPN gateway.

11. The method in accordance with claim 10, wherein, upon determining that present connection data differs from prior connection data, initiating a VRS validation request for the VOIP telephony device.

12. A system comprising:
    means for establishing a location database for a first network that associates Internet Protocol address information for VOIP telephony devices with physical locations for the VOIP telephony devices;
    means for detecting registration of a VOIP telephony device through a network port of the first network;
    means for determining physical location of the VOIP telephony device by identifying physical location of the network port through which the VOIP telephony device is connected, and updating the location database, wherein determining the physical location of the network port through which the VOIP telephony device is connected comprises i) sending an ICMP Protocol Ping message to the VOIP telephony device, ii) comparing a present IP address to a last known IP address, and iii) upon determining that the present IP address is the same as the last known IP address, sending an SNMP query to the last known connection port to determine if the VOIP telephony device is located on a different port of a same device; and means for detecting IP telephony activity originating from a remote VOIP telephony device connected to the first network through a VPN gateway, determining physical location of the remote VOIP telephony device connected through the VPN gateway by identifying physical locations of network resources of a second network to which the remote VOIP telephony device is connected, and updating the location database;

such that updated location information is provided to a 911 server in the event that an emergency call is originated by any one of a VOIP telephony device and remote VOIP telephony device.

13. The system of claim 12, wherein the means for establishing a location database for the first network comprises:

means for capturing information regarding network elements using Netinventory and storing the captured information in a database using NetML format;

means for capturing the subsequent level of network detail using network tools and updating the database to include substantially complete network topology; and means for capturing location data regarding the network elements and updating the database to include basic location information.

14. The system of claim 12, further comprising:

means for upon determining one of i) that the present IP address is not the same as the last known IP address and ii) that the VOIP telephony device is located on the different port of the same device, accessing and analyzing original location information;

means for requesting additional route information based upon application of analysis tools across the network;

means for sending an SNMP query to each router or layer 3 device in the return information; and means for sending an ICMP traceroute message to the VOIP telephony device.

15. The system of claim 14, wherein the means for sending an ICMP traceroute message further includes means for sending a trace packet.

16. The system of claim 14, further comprising:

means for storing information returned from the ICMP traceroute message;

means for sending an SNMP query to the last device in the path for the MAC address of the VOIP telephony device;

means for determining whether a direct connected port exists on the device; and means for updating the location database.

17. The system of claim 16, further comprising:

means for determining that there is no direct connected port on the device;

means for searching for intermediate network equipment for attachment to the VOIP telephony device;

means for transmitting an SNMP query to the connected device for validation; and means for updating the location database.

18. The system of claim 12, further comprising:

means for determining that a location ambiguity exists;

means for transmitting a location validation request to the VOIP telephony device via a Voice Response System (VRS); and means for evaluating VRS data to determine whether ambiguity has been substantially eliminated.

19. The system of claim 18, further comprising:

means for determining that ambiguity still exists after evaluating VRS data;

means for generating an error message; and means for soliciting human intervention to determine location information for the VOIP telephony device.

20. The system of claim 12, wherein the means for determining physical location of the remote VOIP telephony device connected through the VPN gateway further comprises means for transmitting an SNMP query through the VPN gateway to identify network elements of the second network to which the VOIP telephony device is connected.

21. The system of claim 20, further comprising:

means for evaluating results of the SNMP query; and means for evaluating and comparing SNMP query results to prior connection data for the VOIP telephony device connected through the VPN gateway.

22. The system of claim 21, further comprising:

means for determining that present connection data differs from prior connection data; and means for initiating a VRS validation request for the VOIP telephony device.

* * * * *